United States Patent Office 3,458,509

Patented July 29, 1969

1

3,458,509

4-ALLYLTETRAHYDRO-DIMETHYL-2H-1,4-THIAZINES

Leonard Levine, Lake Jackson, Tex., assignor to The Dow Chemical Company, Midland, Mich., a corporation of Delaware No Drawing. Filed Oct. 24, 1966, Ser. No. 588,728
Int. Cl. C07d *93/10;* A01n *9/22;* C09k *3/00*
U.S. Cl. 260—243 1 Claim

ABSTRACT OF THE DISCLOSURE

4 - allyltetrahydro - 2,6 - dimethyl - 2H - 1,4-thiazine is prepared by the reaction of diallylamine with propylene sulfide. The compound has antioxidant and insecticidal activity. For example, it can be used as an antioxidant in halogenated hydrocarbon solvents such as trichloroethylene.

This invention is concerned with novel 4-allyltetrahydro-dimethyl-1,4-thiazines and is particularly directed to 4 - allyltetrahydro - 2,6 - dimethyl - 2,6 - dimethyl-2H-1,4-thiazine of the formula:

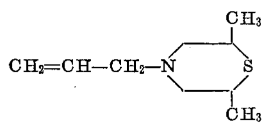

4-allyltetrahydro-2,6-dimethyl-2H-1,4-thiazine is a colorless liquid which is soluble in a variety of organic solvents such as acetone, benzene and chlorinated hydrocarbons. The compound has been found to be useful as an antioxidant and as an insecticide.

4-allyltetrahydro - 2,6 - dimethyl-2H-1,4-thiazine is prepared by the reaction of diallylamine and propylene sulfide. The reaction proceeds readily when the reagents are contacted and mixed, preferably in the presence of an inert organic solvent such as toluene as a reaction medium. The reaction takes place at temperatures from about 50° to 200° C., and is preferably carried out under pressure in an autoclave at temperatures from about 100° to 130° C. The reaction consumes the reactants in equimolar proportions, and the use of the reactants in at least such proportions is desirable, the use of excess diallylamine being preferred.

In the preparation of the novel compound, one molar proportion of propylene sulfide and excess diallylamine (conveniently two molar proportions of diallylamine) are mixed together with an inert organic solvent. The mixture is heated to within the desired temperature range in an autoclave for a period of time, preferably from 0.5 to 4 hours. The product is separated from the reaction mixture by such conventional methods as evaporation and distillation. The product separated as described above may be employed directly in insecticidal and antioxidant operations or further purified by such conventional methods as distillation.

2

In representative operations, diallylamine (97 grams; 1.0 mole) and propylene sulfide (37 grams; 0.50 mole) were added to 250 milliliters of toluene. The resulting mixture was placed in two citrate bottles and the bottles were capped. The closed bottles were placed in an autoclave and heated for four hours at 120°-130° C. with rotation. The mixture was then maintained at 100° C. overnight. The reaction mixture, which had become cloudy, was filtered and concentrated by evaporation in vacuo. The evaporation residue was distilled and the 4-allyltetrahydro-2,6-dimethyl-2H-1,4-thiazine product was collected as a fraction boiling at 34°–38° C. under a pressure of 0.6 millimeter of mercury. The product was found to have an index of refraction, $n_D^{25}=1.4972$, and was found by analysis to have sulfur and nitrogen contents of 18.6 and 8.34 percent, respectively, as compared with the theoretical contents of 18.7 and 8.18 percent, respectively, calculated for the named structure. The structure of the product was confirmed by infrared spectroscopy, mass spectroscopy and nuclear magnetic resonance analysis.

In the preparation of 4-allyltetrahydro-2,6-dimethyl-2H-1,4 - thiazine in the procedure described above, minor amounts of 4-allyltetrahydro-2,5-dimethyl-2H-1,4-thiazine are produced. Preparations including small amounts of the above-named isomer can be used for the same purposes as the 4-allyltetrahydro-2,6-dimethyl-2H-1,4-thiazine of the invention.

In representative operations, the 4-allyltetrahydro-2,6-dimethyl-2H-1,4-thiazine prepared as described above was dissolved in trichloroethylene in the amount of 0.1 percent by volume and two 200-milliliter portions of the resulting solution were placed in separate 500 milliliter flasks. The trichloroethylene was found to have an acidity of less than 0.005 percent by weight as hydrogen chloride by titration using bromothymol blue as an indicator. The flasks were placed over lighted 150 watt frosted electric light bulbs, and air was bubbled continuously through the solutions for 48 hours. A similar sample of trichloroethylene without additament was similarly exposed to light and air to serve as a check. At the end of the test period, the acidity of the trichloroethylene check was found to have increased to 0.592 percent by weight as hydrogen chloride, while the acidity of the trichloroethylene samples containing 0.1 percent by volume of 4-allyltetrahydro-2,6-dimethyl-2H-1,4-thiazine was found to be 0.007 and 0.005 percent by weight as hydrogen chloride, respectively.

I claim:

1. 4-allyltetrahydro-2,6-dimethyl-2H-1,4-thiazine.

References Cited

Bellaart: Chem. Abstracts, vol. 57 (1962), col. 2215.

ALEX MAZEL, Primary Examiner

R. J. GALLAGHER, Assistant Examiner

U.S. Cl. X.R.

252—402; 260—652.5, 999